United States Patent [19]

Potters et al.

[11] Patent Number: 4,635,988
[45] Date of Patent: Jan. 13, 1987

[54] PROCEDURE AND DEVICE FOR GRIPPING PARCELS

[76] Inventors: Michel Potters, Jacob Catslaan 15, 4873 GT Etten Leur, Netherlands; Georges Bancon, 25 BD Joffre, 54000 Nancy, France

[21] Appl. No.: 679,081

[22] Filed: Nov. 30, 1984

Related U.S. Application Data

[63] Continuation-in-part of Ser. No. 478,495, Mar. 24, 1983, abandoned.

[30] Foreign Application Priority Data

Mar. 24, 1982 [FR] France ................................ 82 04975

[51] Int. Cl.[4] .............................................. B66C 1/02
[52] U.S. Cl. ..................................... 294/64.1; 403/90; 414/72; 414/121; 414/737
[58] Field of Search .................. 414/71, 72, 121, 737, 414/786; 294/64.1, 65, 119.4; 271/108; 403/90

[56] References Cited

U.S. PATENT DOCUMENTS

| | | | |
|---|---|---|---|
| 3,031,906 | 5/1962 | Holman | 414/71 X |
| 3,040,920 | 6/1962 | Harris | 294/64 R X |
| 3,152,828 | 10/1964 | Lytle | 294/64.1 |
| 3,183,032 | 5/1965 | Warfel | 294/65 |
| 3,291,518 | 12/1966 | Weinert | 294/64.1 |
| 3,322,454 | 5/1967 | Mindrum | 294/64.1 |
| 3,342,359 | 9/1967 | Sawdey | 294/64 R |
| 3,377,096 | 4/1968 | Wood | 294/64 R |
| 3,591,227 | 7/1971 | Creskoff | 294/65 |
| 3,757,966 | 9/1973 | Cox et al. | 414/71 X |
| 3,785,691 | 1/1974 | Sperry | 294/64.1 |
| 3,982,782 | 9/1976 | Bos | 294/64 R |
| 4,099,762 | 7/1978 | Hultdin et al. | 294/119.4 |

FOREIGN PATENT DOCUMENTS

| | | | |
|---|---|---|---|
| 1216630 | 12/1970 | United Kingdom | 294/64 R |
| 307036 | 8/1971 | U.S.S.R. | 294/64 R |
| 619703 | 8/1978 | U.S.S.R. | 403/90 |

Primary Examiner—Leslie J. Paperner
Attorney, Agent, or Firm—Oblon, Fisher, Spivak, McClelland & Maier

[57] ABSTRACT

A method and apparatus for handling parcels wherein, for the handling of bulky parcels with a low mass and covered with a relatively fragile wrapping, a gripping method is utilized which serves to exert suction on a relatively large surface area of the parcel so as not to damage the wrapping of the parcels wherein the intensity of suction is controlled and the surface area to which the suction is exerted is determined such that a threshold of tearing resistance of the wrapping is not reached.

11 Claims, 12 Drawing Figures

PROCEDURE AND DEVICE FOR GRIPPING PARCELS

This application is a continuation-in-part of application Ser. No. 478,495 filed Mar. 24, 1983, now abandoned.

BACKGROUND OF THE INVENTION

1. Field of the Invention

The invention concerns a method and apparatus for gripping parcels the nature of which makes handling them by traditional means awkward, and more specifically, the invention is designed for handling parcels which readily change shape, in particular when subjected to mechanical pressure, which are large in size, and which are relatively fragile.

2. Description of the Prior Art

The handling of parcels containing products such as fiberglass wool padding poses quite special problems relating to the dimensions, fragility, and capacity for deformation of such parcels.

In most normal circumstances, fiberglass padding used for insulation purposes is produced in rolls as wide as, or even wider than, 1.20 m and with a diameter of 0.60 m, for example, or perhaps in groups of panels making up a parallelepiped-shaped parcel 1.20 m long and measuring 0.6 m by 0.6 m in its other dimensions. Such parcels, it is clear, are relatively bulky. Moreover, they have a low/mass volume ratio ranging from about 15 $kg/m^3$ to 100 $kg/m^3$, with the result being that a typical roll, as described above, would weigh from 8 kg to 30 kg.

The parcels in question are further distinguished by the fact that their packaging is relatively fragile. The packaging ordinarily consists in a sheet of a macromolecular material, perhaps shrunken, such as sheets of polyvinyl chloride, polyethylene, polypropylene or analogous materials, or sheets of relatively strong paper.

This light packaging has the advantage of being relatively inexpensive, but it protects the product only marginally against deformation or tearing which can result from poorly adapted handling procedures. Accordingly, the packaging contributes to the poorly defined and rounded geometrical forms of the parcels.

Even if an effort is made to process fiberglass-based products continuously on the production line, going directly from fiber-making all the way to final packaging and thereby avoiding transfer operations, it is necessary at the end of the sequence to gather the wrapped products and take them to storage points, usually on pallets or wagons. It is quite difficult to use traditional gripping devices such as hooks, pincers, etc., for placing these goods on pallets because of the susceptibility of the packaging to piercing and the low resistance of the products to crushing. For this reason, the pallets are often loaded manually, a process which is neither satisfactory nor very rational from an economic viewpoint.

SUMMARY OF THE INVENTION

An object of the present invention is to allow for the mechanical handling of parcels such as rolls of glass wool or similar products without posing any risk of damaging the parcels.

Another object of the invention is to allow for handling of the parcels at speeds higher than those available using current methods.

Yet another object of the invention is to make it possible simultaneously to handle several parcels which must be picked up or deposited at different locations.

One additional object of the invention is to make it possible to use the same device to handle parcels of various shapes and/or sizes.

Rolls or packets containing fibrous materials in the shape of flexible mattresses are a particularly representative example of the type of parcel envisaged for the purposes of the invention. For purposes of simplification, all subsequent references in this description will be to parcels of fiberglass wool padding, it being understood that the invention applies equally well to all parcels with analogous characteristics in respect either of their shape or their consistency.

In accordance with the invention, in handling parcels of the type mentioned above the parcel or parcels is grabbed by means of a gripping head which holds the parcel by pneumatic suction on a small portion of the parcel surface. The surface area and degree of suction involved are determined jointly so that, on the one hand, the force applied is sufficient to move the parcel and, on the other hand, the suction is below a level which risks damaging the outer wrapping of the parcel.

In view of the low parcel mass, the suction required of the device, which functions somewhat like a vent hole, is relatively low, and may be lowered the greater the working surface involved, i.e., the surface subjected to the suction. In this way it is possible to lift and move the parcels held by the gripping head while using depression values which are well below levels which might cause the wrapping to explode or tear.

For example, Kraft wrapping paper in sheets weighing 70 $g/m^2$ has a tearing resistance (NF Q 03053) of 36 Mullen and a porosity of 3.5 according to NF T Q 03001. If a gripping head measuring 25 $dm^2$ is used, the maximum mass which theoretically could be held is 500 kg. In practice, given the margin of safety required, a mass of less than 80 kg could be moved without risking any rupture of the wrapping. It bears noting that this is considerably in excess of the usual mass of a roll of fiberglass wool, which typically ranges from about 10 kg to 30 kg. This margin, however, is not totally superfluous, as the seal at the parcel is never perfect. A higher level of static suction makes it possible to compensate for imperfect seals in dynamic operations.

The above commentary on wrapping paper is equally applicable to wrappings using macromolecular materials. Thus a sheet of polyethylene 0.07 mm thick can withstand suction on the order of 300 mbar without tearing or significantly being misshaped.

In light of the above, the technician determines the "gripping surface" needed in each case, that is, for each type of parcel handled, depending on the weight of the parcel and the tearing resistance of the wrapping. Once this surface area has been determined, it may be dealt with using a single vent hole or several vent holes of smaller size at different points on the surface of the parcel.

The shape of the gripping surface obviously may vary widely without changing the operation of the device. Generally speaking, the device according to the invention consists of a gripping head consisting of a depression chamber whose general shape is adapted to the parcel. This chamber is delimited laterally by lips on the outside edge of the gripping head. The lips come into direct contact with the external wrapping of the parcel and, with the latter, provide a seal for the chamber. Their shape is thus adapted to the shape and nature of the parcel so that the seal may be established satisfactorily.

Parcels containing fiber pads wrapped in a flexible wrapping may change shape in order to match the exact configuration of the lip edges. In this case it is not essential that the lips be able to change shape significantly. On the other hand, and in particular in the present case, it appears preferable for the area in which the lip comes into contact with the parcel wrapping to be relatively broad. Contact between an excessively narrow lip and the fragile wrapping could result in undesirable changes in shape or tearing.

When the parcel picked up by the gripping unit has a more rigid outside surface, and when it is not possible to take advantage of slight changes in its shape to guarantee the seal, as for example in the case of a cardboard wrapping, it is desirable for the lips to be relatively flexible.

For parcels which change shape, it is not even essential that the contour of the lips correspond with that of the surface of the parcel against which they are pressed. Thus for cylindrical rolls, for example, it is possible to use rectilinear longitudinal and transversal lips. In this case, the convexity of the roll in the transversal direction is offset by slight pressure to bring the lever into contact with the wrapping all along its length.

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
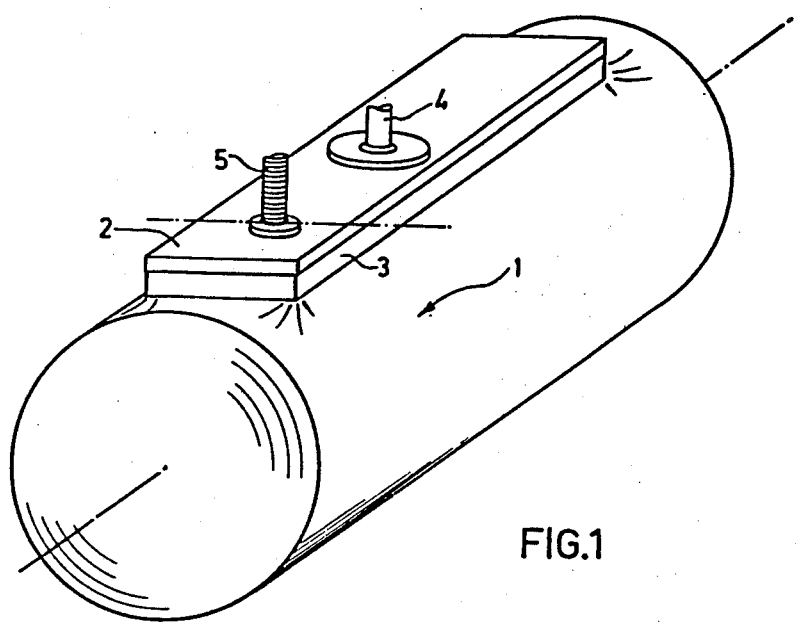
FIG. 1 represents a schematic perspective view of a suction gripping unit in accordance with the invention.

FIG. 1 shows the gripping device according to the invention in position on a roll-shaped parcel 1. In order to press down on as large a surface as possible and thereby reduce the tearing force to which the parcel wrapping is subjected, the device extends over virtually the entire width of the parcel. It consists of a frame 2 on the circumference of which are attached the lips 3.

The gripping device is connected to a lifting system by an arm 4. A flexible tube 5 is connected at one end to the depression chamber of the gripping device and at the other end with a vacuum system (not shown). In the embodiment represented, the depression chamber is assumed to be a single one and only one vacuum source is necessary.

The dimensions of the tube 5 are selected in such a way as to permit a rapid vacuum flow. Thus the operations which result in the gripping of the parcel and its subsequent transfer and release can be carried out with a satisfactory degree of rapidity.

Figure 2:
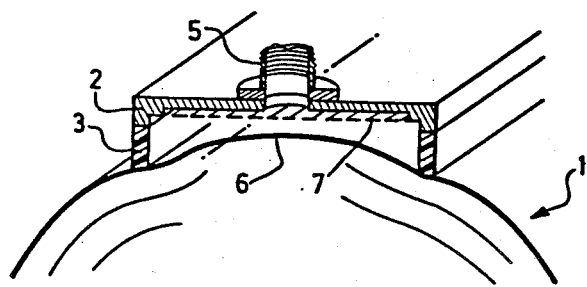
FIG. 2 is a partial cross-sectional view of FIG. 1 on an expanded scale.

The cross-sectional view in FIG. 2 shows more clearly how the parcel 1 is situated with respect to the gripping device. The wrapping 6 of the parcel 1 is pressed against the thick lips 3 which are attached directly to the frame 2.

When aspiration occurs, the wrapping 6 tends to be pressed against the back of the gripping device, making it difficult to maintain uniform suction over the entire surface. In order to restore adequate air circulation conditions, a space is provided between the back 2 and the wrapping 6 by interposing a grip 7 which keeps the wrapping away from the frame 2 without modifying the suction conditions.

In practice, as shown in the FIGURES, the edges of the lips are all located in the same plane. Altering the shape of roll-shaped parcels makes it possible to restore a relative seal.

It is clear in all cases that the seal in contact with the parcel 1 is not perfect. Suction is maintained in the chamber only dynamically. Aspiration is continuous during the entire time the parcel is carried by the gripping device. Interruption in the application of vacuum to the suction chamber corresponds to the setting down of the parcel 1.

Interruption of aspiration may be effected either at the origin of the suction, by turning off the aspirating system, such as a blower for example, or at any point along the vacuum circuit, by closing an associated valve. In the case of repeated operations it is preferable to arrange for continuous operation of the aspiration system and to break the suction along the circuit as close as possible to the suction chamber. The inertia of the unit is thus reduced as much as possible and the rate of operation may be increased proportionately.

For this type of operation, a valve or flap valve (not shown) may be located at the end of the tube 5 next to the gripping device. The functioning of the flap valve or valve is triggered electrically or pneumatically from the control point. For repeated operations, this control point is ordinarily automated in a traditional manner.

If it is possible to separately control the suction to each part, picking up and setting down of the parcels 1 may be carried out independently which may be practical, for example, for offloading at several points parcels picked up at one, or vice versa.

The gripping device according to the invention shown in FIGS. 1 and 2 comprises a single unit. In fact, for handling a series which includes an extremely large number of parcels, it may be advantageous to mount several units on the same chassis.

Figure 3:
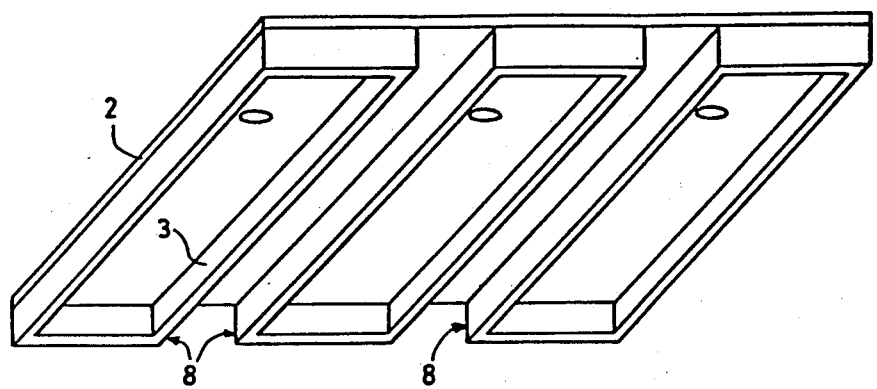
FIG. 3 is a perspective view from beneath a gripping unit consisting of three gripping heads mounted on one chassis.

FIG. 3 illustrates one embodiment in which three units are arranged on a single frame 2. Such a device is useful in particular for picking up and setting down parcels 1 in a pre-established order. The parcels 1 gripped by this device may be arranged in groups of three, with a view to storing them on a pallet, for example.

It is also possible to facilitate the construction of units in special configurations. For example, a quincuncial arrangement may be used to advantage for cylindrical parcels, requiring the alternate establishment of odd and even rows. Appropriate commands to the device make it possible to use one, two or three parts 8 and to determine the number of parcels 1 picked up depending on the row being formed.

The distance separating parts 8 from one another depends on the size of the parcels to be gripped. It is obvious that their spacing is preferably such that the parcels gripped are side by side.

Figure 4:
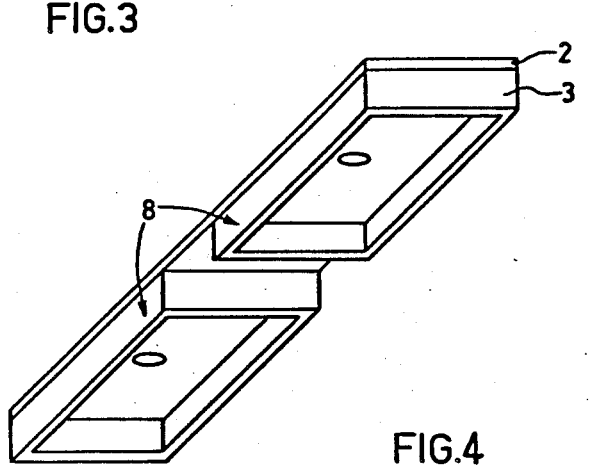
FIG. 4 is a perspective view from beneath a gripping unit whose length has been doubled.

Of course the parts 8 may also be arranged in a series longitudinally as represented in FIG. 4 or be laid out in a set of several rows, with each row made up of several parts. The arrangements used in this regard are determined by the manner in which the parcels are shaped and are routed to the point where they are picked up by the device according to the invention, and also by the arrangement of said parcels in the lots being made up on the pallets or similar devices.

In FIGS. 3 and 4, the gripping parts 8 are all part of the same frame 2. It may also be advantageous to mount the various parts 8 of one unit in such a way as to allow them to move somewhat with respect to one another.

Figure 5:
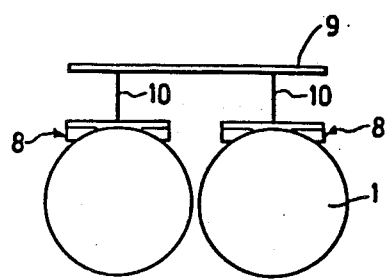
FIG. 5 is a diagram illustrating the means of positioning gripping units according to the invention mounted so as to bend when the parcels picked up are small in size.

FIG. 5 provides a schematic illustration of a device of this type. Two parts 8 are mounted on one chassis 9 by means of supports 10. The mountings of the supports 10 on the chassis 9 and/or the attachments of the parts 8 to the supports 10 may be hinged so as to allow for some degree of tilting of the part. This type of mounting facilitates the proper positioning of the gripping parts vis-a-vis the parcels to be gripped, even if the parcels 1 are not precisely positioned opposite the parts 8.

Figure 6:
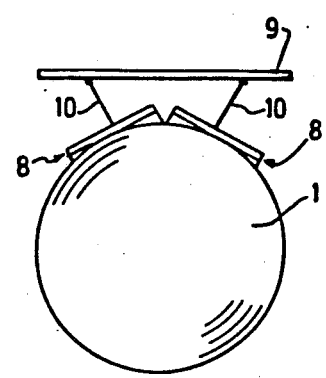
FIG. 6 is a view analogous to the view in FIG. 5 and showing the mode of operation for large parcels.

This type of mounting is also of interest because it makes it possible to pick up large cylindrical parcels as shown in FIG. 6. In this example, the surface area necessary to lift the roll is distributed between the two parts 8, making it possible to maintain good contact with the parcel despite its convexity.

Figure 7:
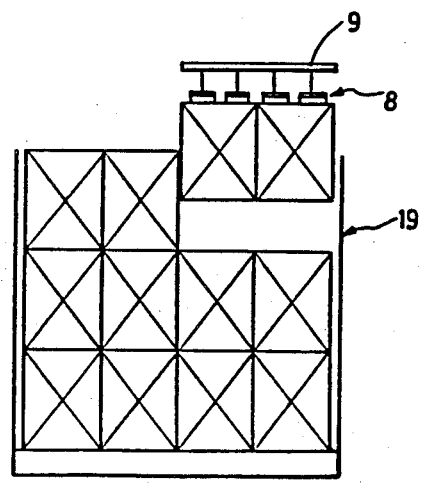
FIG. 7 shows one application for parcels with plane surfaces.

It goes without saying that the same types of mountings may be used to grip parcels 1 with plane surfaces. This is represented schematically in FIG. 7 and which shows that the gripping parts 8 work in pairs and the device is designed to lift two parcels 1 simultaneously. A programmed command makes it possible automatically to govern the movement of the gripping unit so that no intervention is required during the loadings of the pallet or wagon 18.

The gripping devices may be attached to any kind of lifting and transporting arrangement. In particular, such could be articulated arms, movable bridges, swing bars, or combinations of such apparatuses.

In the text which follows, the invention is described in a particular application concerning the loading onto pallets of rolls of glass wool coming directly from the production and packaging line.

Figure 8:
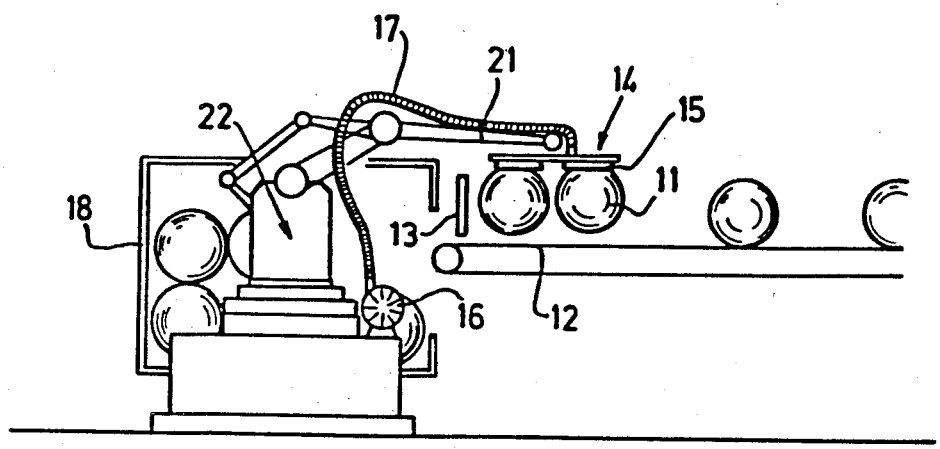
FIG. 8 is a diagram of a unit installed to transfer parcels from the end of a processing sequence onto a pallet by means of an articulated arm.

In FIG. 8, the rolls 11 of fiberglass wool wrapped in a sheet of polyethylene (0.07 mm) are routed along the conveyer belt 12. These rolls are 55 cm in diameter and 120 cm long, and weight 10 kg. At the end of the conveyer belt 12, the rolls are stopped by the stop 13. A gripping device 14 consisting of two vacuum parts 15 is attached to a hinged lifting device 22. Each vacuum part is rectangular in shape (100 cm×25 cm).

A pump 16 is connected to the lifting device. This pump is capable of evacuating 5 $m^3$/minute with a depression of 200 mbar or 10 $m^3$/min with a depression of 30 mbar. Even under the worst conditions each part 15 can hence lift at least 75 kg, i.e., a mass substantially greater than that of the rolls of glass wool. This surplus power of the device is quite adequate to keep the acceleration imparted to the rolls during the course of lifting movements from resulting in their accidential "unhooking."

A flexible ringed tube 17 connects the parts 15 to the pump 16. A valve (not shown) is placed at the input portion of parts 15. Such valve cuts off the aspiration action when the rolls grasped earlier are released onto the pallet wagon 18 on which the rolls are stored. A pneumatic jack acativates the valve.

In more complicated handling operations a separate maneuver may be executed by each part 15 by commanding a valve to open and close for each of the parts 15.

A complete conveyance sequence includes: positioning of the lifting arm 21 above the rolls 1 stopped by the stop 13;

opening of the vacuum valve resulting in the rolls being gripped simultaneously;

raising of the arm 21 and pivoting of such arm, bringing the rolls to the vertical wall of the wagon 18;

lowering of the arm 21 to bring the rolls 11 to the pallet or wagon bed 18 (or to the preceding row of rolls); and closing of the valve bringing about the release of the rolls.

The lifting device is completely automated. All the movements involved in loading the pallet or wagon 18 are programmed. Under the circumstances stipulated above, the pallets or wagons 18 may be loaded at a rate of up to 14 rolls per minute.

In order to ensure proper operation of the lifting systems such as described above, it is advantageous that the gripping elements be constructed so as to allow objects lying in slightly varying positions to be grasped. It is also advantageous to be able to set the objects down in regular positions.

Figure 9:
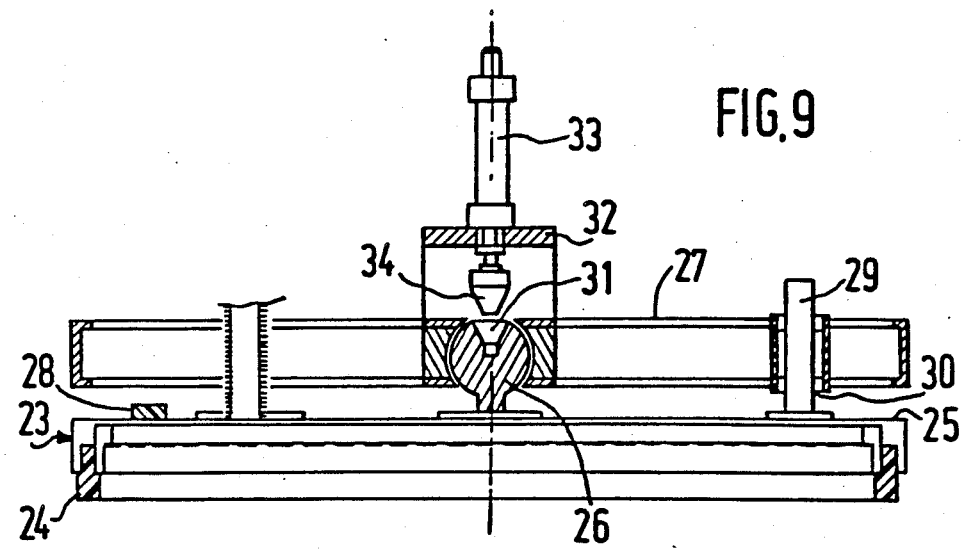
FIG. 9 is a partial longitudinal cross section of a gripping device for use with objects lying in uncertain positions.
Figure 10:
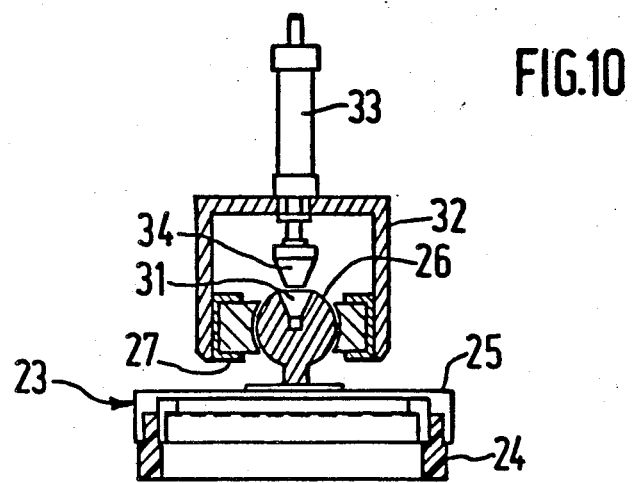
FIG. 10 is a partial transverse cross section of the device of FIG. 9.

The device shown in FIGS. 9 and 10 makes it posible to achieve these advantages.

As seen in FIGS. 9 and 10, the device comprises a single gripping element 23. Analogous units including several elements are of course possible.

As was the case for the preceding devices, the gripping element has thick lips 24 that define an area within which low pressure is formed as the parcels are gripped.

The lips 24 are fastened to a frame 25. Frame 25 is attached by ball joint 26 onto a chassis 27. Lifting means (not shown) are attached to this chassis.

The presence of the ball joint makes possible longitudinal and transverse angling of the gripping element. In this way, irregularities in the positioning of the rolls to be grasped do not impede operations.

Longitudinal and transverse movement is limited by flexible bumpers 28 that absorb shocks occasioned by the frame 25 abutting chassis 27.

A guide bar 29 fixed to the frame 25 is engaged within a channel 30 in chassis 27. The relative dimensions of channel 30 and guide bar 29 are such that they will not constitute an obstacle to the movements of the ball joint holding chassis 27 and frame 25 together. This arrangement discourages rotation of frame 25 parallel to chassis 27.

When the rolls have been gripped, it is advantageous to be able to set them down again in a regular formation. For this purpose, the invention provides for the gripping devices to be locked in well-defined positions.

The locking of the gripping unit corresponding to the immobilization of ball joint 26 may be achieved in the manner shown in FIGS. 9 and 10.

In these figures, ball joint 26 has a cone-shaped recess 31.

A support 32 is fastened onto chassis 27 at the position of ball joint 26. This support is equipped with a cylinder 33 the axis of which passes through the center of ball 26. The end of cylinder shaft 33 facing the ball is attached to a cone-shaped element 34 having a shape complementing recess 31.

While parcels are being gripped, the cylinder is withdrawn to the position shown in FIGS. 9 and 10. The ball is thus able to move freely to suit the shape and position of the parcels. Once the parcels are lifted, the cylinder is activated and element 34 is inserted into recess 31, immobilizing ball joint 26.

By this means, the position of the parcel upon its release may be determined with some precision, thereby facilitating later handling operations.

The operation of cylinder 33 may of course be completely automated, as can the entire operation. When parcels are being handled automatically, it is advantageous to be able to check the operation of the unit. In particular, it is desirable to verify that the parcels have in fact been siezed. The absence of a parcel in the course of operations would bring about disorder in their stacking after they have been set down.

In order to avoid this sort of problem, it is advantageous according to the invention to provide a detector which will verify that a parcel has indeed been picked up by the gripping unit. This detector may assume varied forms, the simplest being an electrical device of the contact switch type triggered by the pressure of the parcel.

For the verification to be effective, it must be done once the parcel has been raised. The check may be carried out without interrupting the movement of the lifting assembly.

Furthermore, the system may be automated in such a way that when the check shows that a parcel has not been picked up the cycle will be interrupted and the gripping operation recommenced.

The devices of the invention normally undergo constant operation. Although the stresses borne by the unit are not very great, some elements are nevertheless subject to relatively rapid wear. In particular, this is the case with flexible lips 24. For this reason it is advantageous to provide a device that will enable the lips to be easily replaced.

Figure 11:
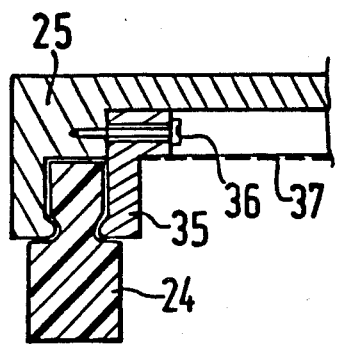
FIG. 11 shows a preferred mounting for attaching the lips of the gripping device.

FIG. 11 shows an assembly that makes possible the replacement of lips 24. In this assembly, lip 24 is held between frame 25 and a releasable piece 35 fastened to the frame by screws 36.

Piece 35 as shown may possibly serve as a support for a grid 37 whose function has previously been discussed. Grid 37 is fastened to piece 35 by means that are not shown, e.g., screws.

Relatively light parcels such as those consisting of fiber-glass rolls are advantageously handled by means of a low-power lifting device. In such cases, it is preferable that the gripping unit itself is as light as possible. For this purpose, it is advantageous to make the rigid parts of the unit out of a reinforced synthetic material, e.g., polyepoxide or glass fiber-reinforced polyester, or a similar material.

Figure 12:
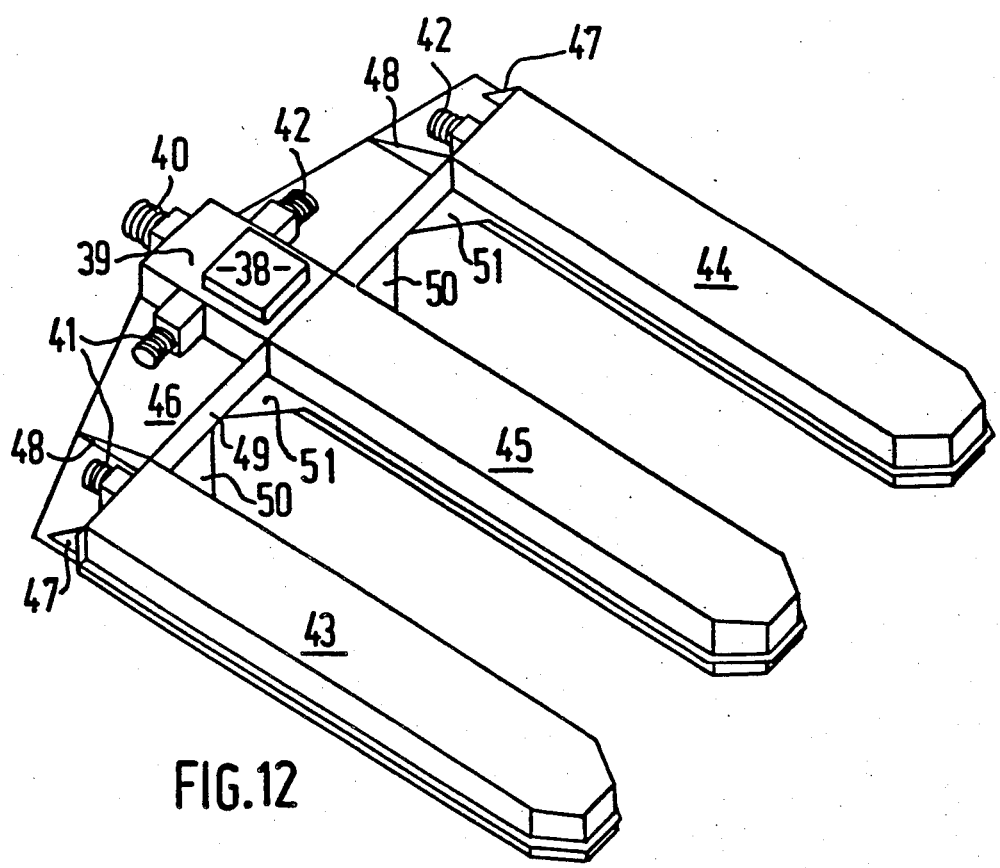
FIG. 12 represents in perspective another unit having three gripping prongs.

By way of example, a unit of the type shown in FIG. 1 and having two gripping elements made of aluminum alloy with a total weight of approximately 18 kg was replaced with a unit such as the one shown in FIG. 12 made of reinforced polyester and having three gripping prongs weighing only 8 kg.

The lightness of the unit in FIG. 12 also explains why it is possible to mount the lifting device asymmetrically. The attachment is made to base 38. This arrangement also makes for a better disengagement from the station from which the fiberglass rolls are picked up. Here the lifting arm no longer hovers over the conveyor. Consequently the arm may also be shorter and the power of the lifting device still lower.

In the unit shown if FIG. 12, suction is pulled through a chamber 39 connected to a pump through channel 40. Conduits 41 and 42, which are only partially shown, connect chamber 39 to gripping prongs 43 and 44 located at the sides. Chamber 39 communicates directly with central gripping prong 45.

Prongs 43, 44, and 45 are rendered integral with one another by means of frame 46 onto which chamber 39 is mounted. "Webs" 50 and 51 and fins 47, 48, and 49 increase the rigidity of the device.

The shape of prongs 43, 44, and 45 is preferentially selected so that they may be produced directly by molding.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for gripping at least one parcel with low mass/volume ratio covered by a thin wrapping comprising:
at least one handling mechanism including:
  (a) a chassis;
  (b) at least one gripping part;
  (c) a ball joint pivotally connecting said at least one gripping part to said chassis; and
  (d) means for locking said ball joint, wherein said ball joint includes a ball fixed to said at least one gripping part, and wherein said means for locking comprises:
    (i) a tapered recess in said ball,
    (ii) a movable element movable into said recess and having the same shape as said recess, and
    (iv) means fixed to said support for moving said movable element into said recess, whereby said ball is rotatably guided and locked relative to said support;
at least one device operatively connected to said handling mechanism for applying pneumatic sunction on part of a surface area of said parcel.

2. An apparatus for gripping according to claim 1, wherein said gripping part forms a suction chamber with a predetermined outline such that said gripping part presses against said parcel virtually without a break in sealing connection with said parcel.

3. An apparatus for gripping according to claim 2, wherein the suction chamber further comprises a continuous lip made of semirigid material delimiting the outside edge of said suction chamber.

4. The device of claim 3 including means for releasably securing said lip to said gripping part.

5. The device of claim 4 wherein said means for releasably securing comprises a releasable piece releasably secured to said gripping part and sandwiching said lip between said gripping part and said releasable piece.

6. An apparatus for gripping according to claim 2, further comprising a source of pneumatic suction and wherein said suction chamber is mounted on said handling mechanism, and conduit means connecting said chamber to said pneumatic suction source.

7. An apparatus for gripping according to claim 1 wherein said chassis further comprises a single chassis and wherein said at least one part further comprises a plurality of parts mounted on said single chassis and further comprising means for selectively operating said parts either simultaneously or in a predetermined sequence.

8. An apparatus for gripping according to claim 7, further comprising means for moving and rotating said plurality of parts about an axis parallel to the plane of the chassis and the axis of the parcel gripped.

9. An apparatus for gripping according to claim 1, wherein said gripping part forms a suction chamber with a predetermined outline such that said gripping part presses against said parcel by exerting a slight downward pressure on said parcel.

10. The device of claim 1 including means for detecting whether said parcel has been gripped by said handling mechanism.

11. The device of claim 1 including means for detecting whether said parcel has been gripped by said handling mechanism.

* * * * *